United States Patent [19]
Doak

[11] Patent Number: 6,041,513
[45] Date of Patent: Mar. 28, 2000

[54] TAPE MEASURE SCORING ATTACHMENT

[76] Inventor: Sidney W. Doak, P.O. Box 761, McCook, Red Willow County, Nebr. 69001

[21] Appl. No.: 08/963,573

[22] Filed: Nov. 6, 1997

Related U.S. Application Data

[63] Continuation of application No. 08/659,601, Jun. 6, 1996, abandoned
[60] Provisional application No. 60/000,433, Jun. 8, 1995.

[51] Int. Cl.[7] ............................... B25H 7/04; G01B 3/10
[52] U.S. Cl. ............................................... 33/668; 33/768
[58] Field of Search ................... 33/668, 759, 760, 33/761, 768, 769, 770, 42

[56] References Cited

U.S. PATENT DOCUMENTS

| | | | |
|---|---|---|---|
| 812,322 | 2/1906 | Badger | 33/668 |
| 2,575,354 | 11/1951 | Mills | 33/42 |
| 2,624,120 | 1/1953 | Mills | 33/42 |
| 2,649,787 | 8/1953 | Kobayashi | 33/42 |
| 3,063,157 | 11/1962 | Keene | 33/668 |
| 3,336,678 | 8/1967 | Chamberlain et al. | 33/668 |
| 3,802,083 | 4/1974 | Freed | 33/668 |
| 4,121,343 | 10/1978 | Duggins et al. | 33/42 |
| 4,630,376 | 12/1986 | Pentecost | 33/760 |
| 4,760,648 | 8/1988 | Doak et al. | 33/668 |
| 5,134,784 | 8/1992 | Atienza | 33/769 |
| 5,154,006 | 10/1992 | Wooster | 33/668 |
| 5,295,308 | 3/1994 | Stevens et al. | 33/668 |
| 5,459,942 | 10/1995 | Hintz, Jr. | 33/768 |
| 5,477,619 | 12/1995 | Kearns | 33/768 |
| 5,671,543 | 9/1997 | Sears | 33/768 |

FOREIGN PATENT DOCUMENTS

| | | | |
|---|---|---|---|
| 2223586 | 4/1990 | United Kingdom | 33/760 |

*Primary Examiner*—G. Bradley Bennett
*Attorney, Agent, or Firm*—Suiter & Associates PC

[57] ABSTRACT

A self-adhesive polymer anchor for clasping a scoring device such as a pencil lead or scratcher to the housing of a conventional tape measure. The marker is secured in the anchor in a concave recess and oriented such that the marking device is in precise alignment with the tape at a given distance from the point the tape extends from the housing.

18 Claims, 2 Drawing Sheets

TAPE MEASURE SCORING ATTACHMENT

CROSS REFERENCE TO RELATED APPLICATIONS

The present application is a continuation of U.S. patent application Ser. No. 08/659,601 filed Jun. 6, 1996, now abandoned which claims the benefit under 35 U.S.C. § 119(e) of U.S. Provisional Application Ser. No. 60/000,433, filed Jun. 8, 1995. Said U.S. patent application Ser. No. 08/659,601 is herein incorporated by reference in its entirety.

TECHNICAL FIELD

The present invention relates generally to conventional tape measures, and more specifically to an attachment mountable to a tape measure housing, enabling a scoring device to be held at a contact point in precise alignment with the tape at a given distance from the housing.

BACKGROUND OF THE INVENTION

When a conventional winding tape measure is used in a measuring process, it is often inconvenient for one to free a hand in order to score the object of measurement. Frequently, the L-shaped anchoring member attached to the free end of the tape becomes dislodged or is required to be moved, thus, requiring continuously manual control. This makes it difficult, if not impossible, for one to hold both the tape measure's housing and L-shaped anchoring member while scoring the object of measurement.

U.S. Pat. No. 5,367,784 to Krebs et al. discloses a clip, mountable to the side of a conventional tape measure housing and secured by a screw centrally to the side of said housing. The clip is comprised of a back plate generally matching the housing surface and two transversely spaced legs extending from the back of the clip, then resiliently biased toward the back plate defining a recess between the legs and the back plate, shaped to receive marking devices. Although the invention effectively provides the means by which a marking device may be operatively attached to a conventional tape measure, said invention needs to be manufactured in a variety of sizes. Additionally, the device may only be fitted to tape measures whose housings have been accordingly manufactured with the means of securing the invention to the housing by means of the screw. Accordingly, there remains a need for an inexpensive apparatus which holds a marking device and which may be fitted to a variety of conventional tape measures without any modification of the tape measure housing in order to secure the device.

SUMMARY OF THE INVENTION

The present invention is generally related to an apparatus designed as an attachment for a conventional tape measure of a type having a housing with an opening therein through which a portion of tape extends, with the remainder of the tape being coiled around a spring biased reel. The present invention consists of a thin self-adhering polymer plate attachable to the base of a tape measure housing. Extending beyond the housing and adjacent to the opening in precise alignment with the tape, the plate contains a cylindrical recess extending through the width of the plate. Within the recess, a scoring device may be secured in precise alignment with the tape at a given distance from the point the tape extends from the housing. One may accordingly mark the object being measured by simply twisting the tape measure housing while the scoring device is in contact with the object of measurement.

The primary object of the present invention is to provide the means by which a scoring device may be operatively attached to a conventional tape measure and oriented in precise alignment with the tape at a given distance from the housing.

Another object of the present invention is to provide the means by which a scoring device may be operatively attached to tape measures of a variety of sizes A further object of the invention is to provide a means by which a scoring device may be attached to a tape measure without any modification of the tape measure housing.

A still further object of the present invention is to provide an inexpensive means by which a scoring device may be attached to a conventional tape measure housing.

Other objects, advantages and novel features of the present invention will become apparent from the following detailed description of the invention when considered in conjunction with the drawings.

DESCRIPTION OF A PREFERRED EMBODIMENT

Figure 1:
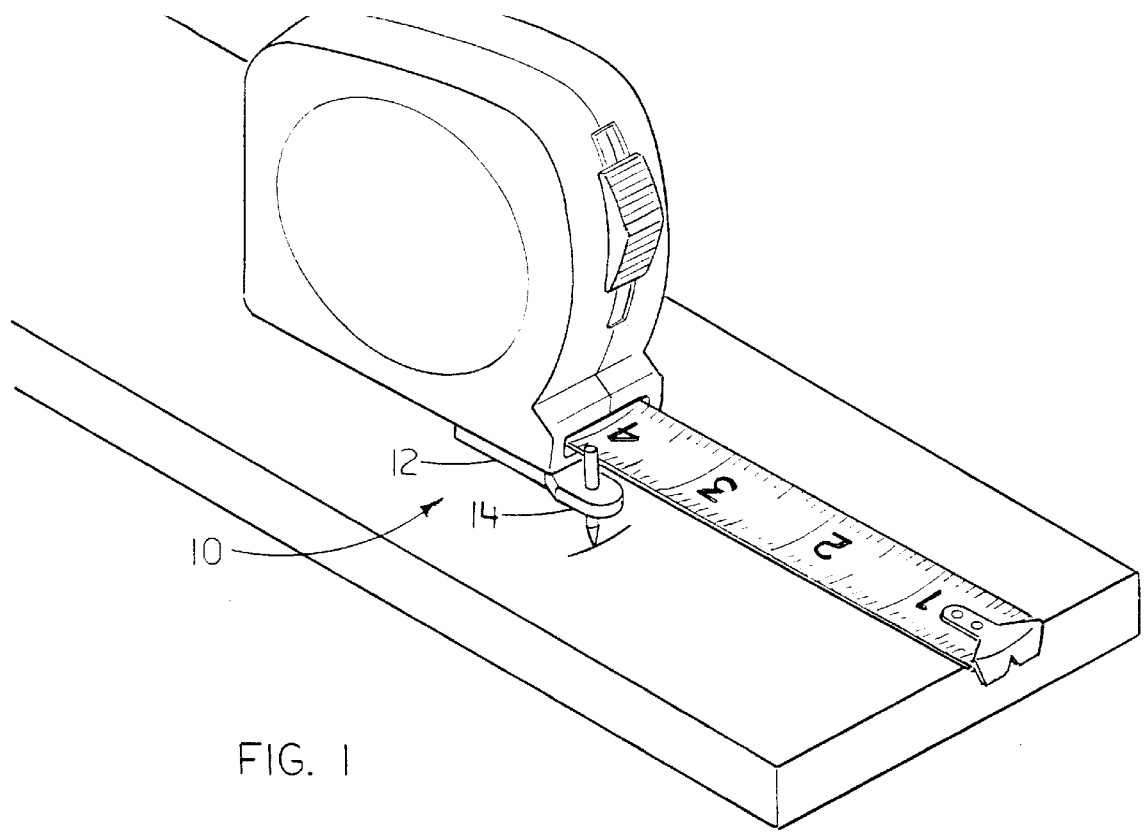
FIG. 1 is a perspective view of the present invention as operatively secured to a tape measure housing.
Figure 2:
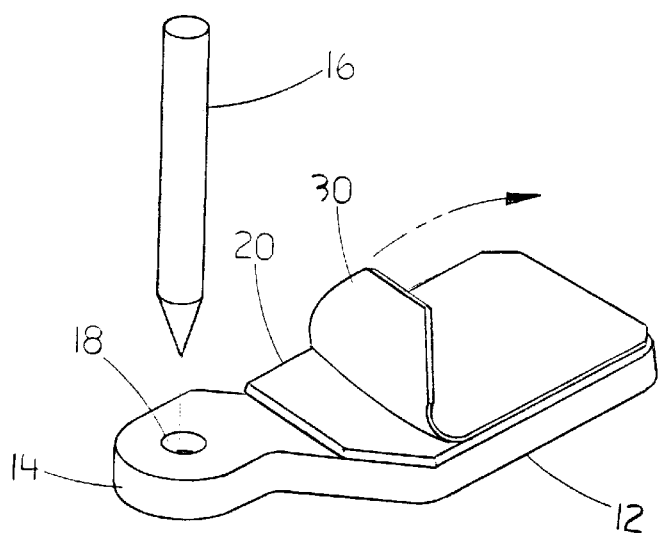
FIG. 2 is a perspective view of the present invention illustrating the insertion of a marking device therein.

Referring now to the drawings, wherein like reference numerals designate identical or corresponding views, FIG. 1 exemplifies the full embodiment of the present invention 10 consisting of a generally four sided self-adhesive anchor 12 and a generally round clasping appendage 14. From the perspective view presented in FIG. 2, one may see the operative positioning of a scoring device 16 within the cylindrical recess 18 central to the clasping appendage 14. An adhesive surface 20 may be exposed by removing a paper cover 30 or the like so that the self-adhesive anchor 12 may be attached to a tape measure housing (not shown).

Figure 3:
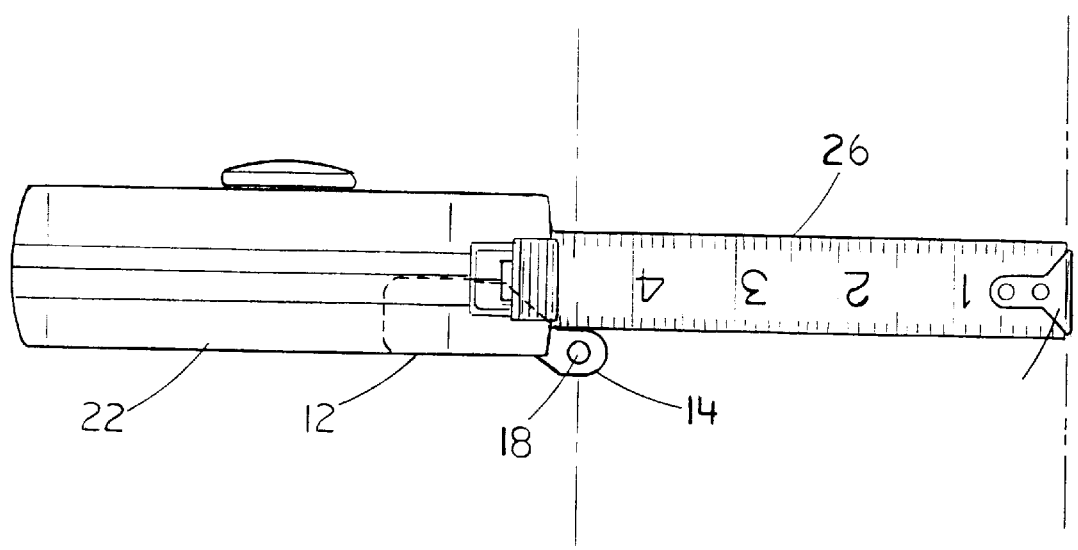
FIG. 3 is a top plan view of the invention as operatively secured to a tape measure housing.
Figure 4:
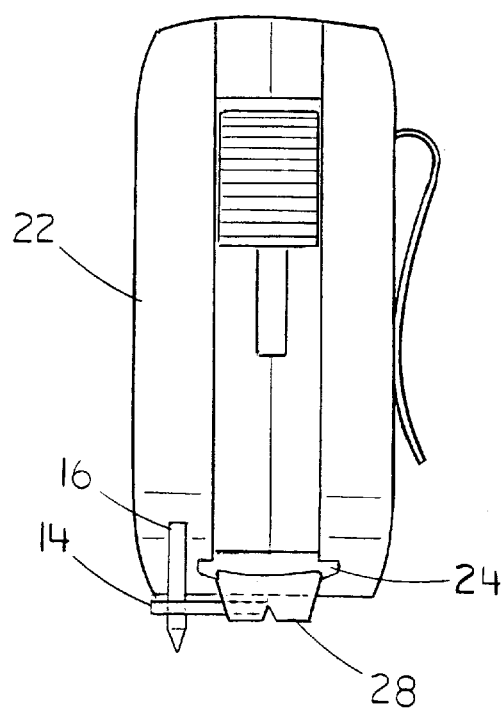
FIG. 4 is a side elevational view of the present invention as operatively secured to a tape measure housing.

The present invention may be employed by as seen in FIGS. 3 & 4 by placing the self-adhering anchor 12 upon the tape measure housing 22 in a position on the housing directly below the opening 24. The clasping appendage 14 should be positioned so the center of the cylindrical recess 18 is in direct alignment with the tape measure housing 22 at a given distance from the point the tape 26 exits through the opening 24. A scoring device 16 such as a metal scribe or a lead marker may be positioned within the concave recess 18 so that the functional end extends slightly below the surface of the housing 22 lying parallel to the object of measurement.

Once the invention 10 is precisely positioned on the tape measure housing 22, it may be operated through attachment of the L-shaped anchoring member 28 to the object being measured and extending the tape 26 to the desired length. Once the tape 26 is extended, one may record a single mark by simply twisting the tape measure housing 22 allowing the scoring device 16 to rub against the object of measurement, thus, recording a precise measurement.

Alternatively, the present invention 10 may be utilized to draw a line delimiting an entire length of an object of measurement. In such a case, one would engage the tape's L-shaped anchoring member 28 to the edge of an object of measurement and lock the tape 26 in place. By moving both the housing 22 and L-shaped anchoring member 28 along the object to be measured with the tape 26 tightly extended, the scoring device may be drawn across the object at a constant length from its edge where the L-shaped anchoring member is in contact.

Accordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

What is claimed is:

1. A scoring device assembly for a tape measure of the type having a housing with an opening therein through which a portion of a tape having measurement indicia thereon is extendable with the remainder of the tape being coiled around a spring biased reel disposed in said housing, said tape measure scoring device comprising:

a flat anchor attachable to a bottom surface of said housing; and an appendage integrally formed in said anchor so as to extend beyond said bottom surface along said extended portion of said tape, said appendage including a cylindrical recess positioned for holding a scoring device at a predetermined distance from said opening;

wherein said anchor and appendage are generally coplanar with said bottom surface so as to be positioned generally below said extended portion of said tape to allow unobstructed view of a scoring device held in said appendage and said measurement indicia.

2. The scoring device assembly in accordance with claim 1, wherein an upper surface of said anchor comprises an adhesive for attaching said anchor to said bottom surface.

3. The scoring device assembly in accordance with claim 1, further comprising a scoring device.

4. The scoring device assembly in accordance with claim 3, wherein said scoring device comprises a lead.

5. The scoring device assembly in accordance with claim 3, wherein said scoring device comprises a metal scribe.

6. The scoring device assembly of claim 1, wherein said anchor comprises a flat plate having a cross-sectional thickness which does not unnecessarily raise said extended portion of said tape adjacent to said housing from a surface being measured so as to not induce error in measurement.

7. A measurement device, comprising:

a tape measure of the type having a housing with an opening therein through which a portion of a tape having measurement indicia thereon is extendable with the remainder of the tape being coiled around a spring biased reel disposed in said housing;

a flat anchor attachable to a bottom surface of said housing; and an appendage integrally formed in said anchor so as to extend beyond said bottom surface along said extended portion of said tape, said appendage including a cylindrical recess positioned for holding a scoring device at a predetermined distance from said opening;

wherein said anchor and appendage are generally coplanar with said bottom surface so as to be positioned below said extended portion of said tape to allow unobstructed view of a scoring device held in said appendage and said measurement indicia.

8. The measurement device in accordance with claim 7, wherein an upper surface of said anchor comprises an adhesive for attaching said anchor to said bottom surface.

9. The measurement device in accordance with claim 7, further comprising a scoring device.

10. The measurement device in accordance with claim 9, wherein said scoring device comprises a lead.

11. The measurement device in accordance with claim 9, wherein said scoring device comprises a metal scribe.

12. The scoring device assembly of claim 7, wherein said anchor comprises a flat plate having a cross-sectional thickness which does not unnecessarily raise said extended portion of said tape adjacent to said housing from a surface being measured so as to not induce error in measurement.

13. A scoring device assembly for a tape measure of the type having a housing with an opening therein through which a portion of a tape having measurement indicia thereon is extendable with the remainder of the tape being coiled around a spring biased reel disposed in said housing, said tape measure scoring device comprising:

means for attaching the scoring device to a bottom surface of said housing; and means, extending beyond said bottom surface along said extended portion of said tape, for holding a scoring device at a predetermined distance from said opening;

wherein said attaching and holding means are generally coplanar with said bottom surface so as to be positioned below said extended portion of said tape to allow unobstructed view of a scoring device held by said holding means and said measurement indicia.

14. The scoring device assembly in accordance with claim 13, wherein said attaching means comprises a substantially flat anchor having an upper surface coated with adhesive for attaching said anchor to said bottom surface.

15. The scoring device assembly in accordance with claim 13, further comprising means for scoring a surface.

16. The scoring device assembly in accordance with claim 15, wherein said scoring means comprises a lead.

17. The scoring device assembly in accordance with claim 15, wherein said scoring means comprises a metal scribe.

18. The scoring device assembly of claim 13, wherein said attaching means has a cross-sectional thickness which does not unnecessarily raise said extended portion of said tape adjacent to said housing from a surface being measured so as to not induce error in measurement.

* * * * *